US012659626B2

(12) United States Patent
Kim et al.

(10) Patent No.: US 12,659,626 B2
(45) Date of Patent: Jun. 16, 2026

(54) IMAGE SENSOR

(71) Applicant: Samsung Electronics Co., Ltd., Suwon-si (KR)

(72) Inventors: Sungyong Kim, Suwon-si (KR); Ji-Yong Kim, Suwon-si (KR); Jaejin Jung, Suwon-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 400 days.

(21) Appl. No.: 18/362,176

(22) Filed: Jul. 31, 2023

(65) Prior Publication Data

US 2024/0259712 A1 Aug. 1, 2024

(30) Foreign Application Priority Data

Feb. 1, 2023 (KR) ........................ 10-2023-0013683

(51) Int. Cl.
*H04N 25/76* (2023.01)
*H04N 25/78* (2023.01)

(52) U.S. Cl.
CPC ......... *H04N 25/7795* (2023.01); *H04N 25/78* (2023.01)

(58) Field of Classification Search
CPC .... H04N 25/7795; H04N 25/78; H04N 25/79; H04N 25/62; H04N 25/77; H10F 39/1825
See application file for complete search history.

(56) References Cited

U.S. PATENT DOCUMENTS

| | | | | |
|---|---|---|---|---|
| 7,088,279 | B2 | 8/2006 | Muramatsu et al. | |
| 7,423,465 | B2 | 9/2008 | Gomm | |
| 7,994,834 | B2 | 8/2011 | Ku | |
| 10,965,297 | B1 | 3/2021 | Wu et al. | |
| 11,469,767 | B1 * | 10/2022 | Zhang | H03M 1/38 |
| 2007/0001726 | A1 * | 1/2007 | Lee | H03K 5/1565 327/175 |
| 2010/0073057 | A1 | 3/2010 | Ku | |
| 2011/0187907 | A1 * | 8/2011 | Takahashi | H10F 39/12 341/169 |
| 2016/0269013 | A1 * | 9/2016 | Lim | H04N 25/75 |
| 2017/0092682 | A1 * | 3/2017 | Choi | H04N 25/69 |
| 2019/0289241 | A1 * | 9/2019 | Saeki | H03M 1/123 |
| 2021/0050379 | A1 * | 2/2021 | Baek | H01L 24/05 |
| 2021/0184656 | A1 * | 6/2021 | Ono | H03H 7/06 |
| 2022/0286626 | A1 * | 9/2022 | Elsayed | H04N 25/78 |

FOREIGN PATENT DOCUMENTS

| | | |
|---|---|---|
| KR | 2004-0022474 A | 3/2004 |
| KR | 101050406 B1 | 7/2011 |

* cited by examiner

*Primary Examiner* — Nhan T Tran
(74) *Attorney, Agent, or Firm* — Harness, Dickey & Pierce, P.L.C.

(57) ABSTRACT

An image sensor includes: a first substrate including a plurality of pixels; and a second substrate including a clock signal generator configured to generate a first clock signal, at least one buffer configured to receive the first clock signal from the clock signal generator and generate a buffered clock signal, a ramp signal generator configured to receive the buffered clock signal and generate a ramp signal based on the buffered clock signal, wherein a time length of an on-duty period of the first clock signal is different from a time length of an on-duty period of the buffered clock signal.

20 Claims, 12 Drawing Sheets

100

300

600

900

1200

IMAGE SENSOR

CROSS-REFERENCE TO RELATED APPLICATION

This application claims priority to Korean Patent Application No. 10-2023-0013683 filed on Feb. 1, 2023, the entire disclosure of which is incorporated herein by reference.

BACKGROUND

(1) Field

The inventive concepts relate to image sensors.

(2) Description of the Related Art

An image sensor is a device that captures a two-dimensional or three-dimensional image of an object. The image sensor generates an image of the object using a photoelectric conversion element that reacts according to intensity of light reflected from the object.

Recently, a stacked complementary metal-oxide semiconductor (CMOS) image sensor has been developed to stack a layer where a pixel array including the photoelectric conversion element is disposed and a layer where a logic circuit for driving the pixel array and generating the image is disposed so that a region of the pixel array is wide and size of the image sensor is small.

SUMMARY

Some example embodiments include an image sensor that is configured to reduce, minimize, or prevent local heating of a stacked complementary metal-oxide semiconductor (CMOS) image sensor.

Some example embodiments include an image sensor that is configured to reduce power consumption of the stacked CMOS image sensor.

An image sensor according to some example embodiments may include a first substrate and a second substrate. The first substrate may include a plurality of pixels and the second substrate may include a clock signal generator configured to generate a first clock signal, at least one buffer configured to receive the first clock signal from the clock signal generator and generate a buffered clock signal, a ramp signal generator configured to receive the buffered clock signal and generate a ramp signal based on the buffered clock signal, wherein a time length of an on-duty period of the first clock signal is different from a time length of an on-duty period of the buffered clock signal.

An image sensor according to some example embodiments may include a first substrate and a second substrate. The first substrate may include a plurality of pixels and the second substrate may include a clock signal generator configured to generate a first clock signal, at least one buffer configured to receive the first clock signal from the clock signal generator and generate a buffered clock signal, and a duty correction circuit configured to receive the buffered clock signal and adjust a duty ratio of the buffered clock signal to generate a second clock signal.

DETAILED DESCRIPTION

Figure 1:
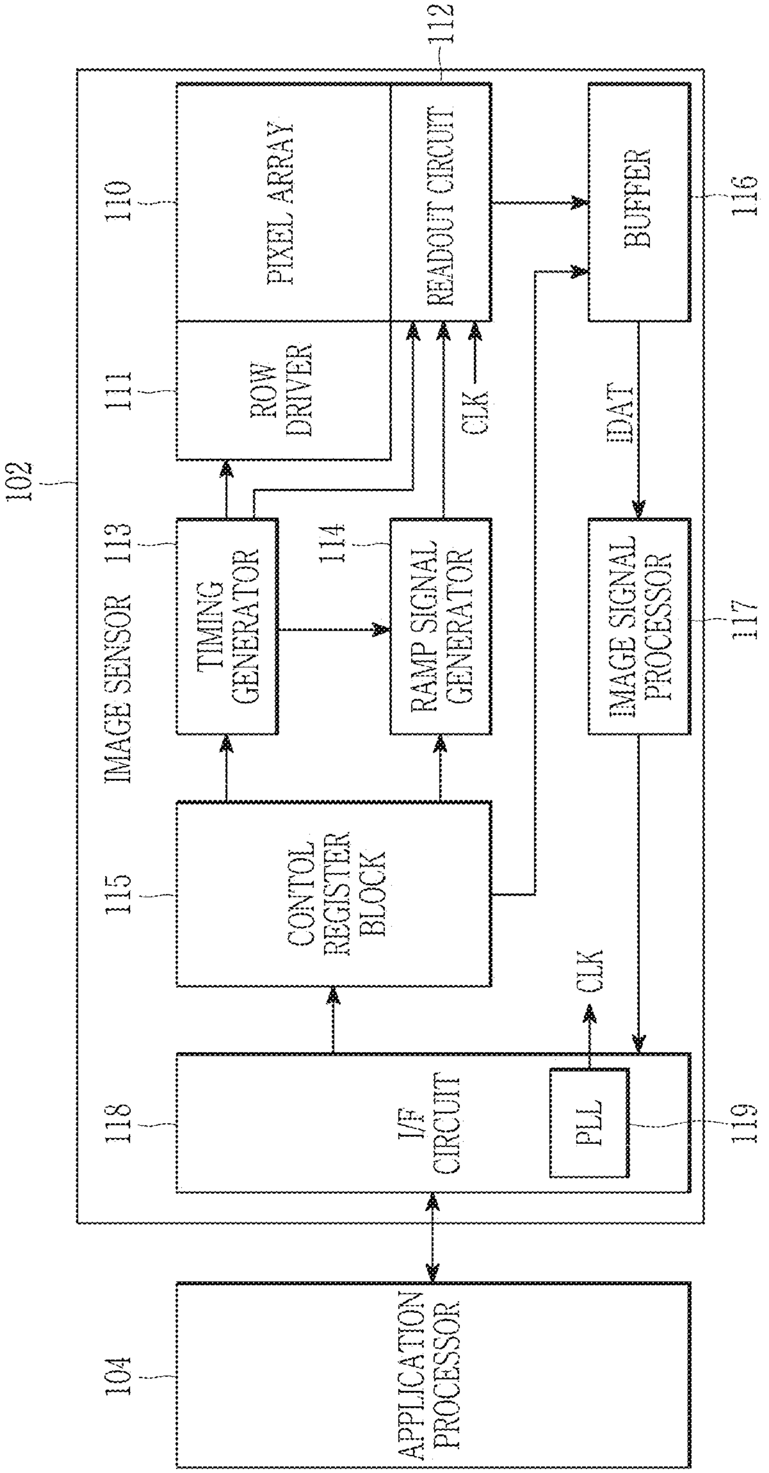
FIG. 1 is an example block diagram of an image sensing system according to some example embodiments.

The present inventive concepts will be described more fully hereinafter with reference to the accompanying drawings, in which embodiments of the inventive concepts are shown. As those skilled in the art would realize, the described embodiments may be modified in various different ways, all without departing from the spirit or scope of the present inventive concepts.

Accordingly, the drawings and description are to be regarded as illustrative in nature and not restrictive. Like reference numerals designate like elements throughout the specification. In the flowcharts described with reference to the drawings in this specification, the operation order may be changed, various operations may be merged, certain operations may be divided, and certain operations may not be performed.

In addition, a singular form may be intended to include a plural form as well, unless the explicit expression such as "one" or "single" is used. Terms including ordinal numbers such as first, second, and the like will be used only to describe various constituent elements, and are not to be interpreted as limiting these constituent elements. These terms may be used for a purpose of distinguishing one constituent element from other constituent elements.

Throughout the specification, when a part is "connected" to another part, it includes not only a case where the part is "directly connected" but also a case where the part is "indirectly connected" with another part in between. In addition, unless explicitly described to the contrary, the word "comprise" and variations such as "comprises" or "comprising" will be understood to imply the inclusion of stated elements but not the exclusion of any other elements.

It will be understood that when an element such as a layer, film, region, area, or substrate is referred to as being "on" or "above" another element, it can be directly on the other element or intervening elements may also be present. In contrast, when an element is referred to as being "directly on" another element, there are no intervening elements present. Further, in the specification, the word "on" or "above" means positioned on or below the object portion, and does not necessarily mean positioned on the upper side of the object portion based on a gravitational direction.

The use of the term "the" and similar demonstratives may correspond to both the singular and the plural. Operations constituting methods may be performed in any suitable order unless otherwise indicated herein or otherwise clearly contradicted by context and are not necessarily limited to the stated order.

The use of all illustrations or illustrative terms in some example embodiments is simply to describe the technical ideas in detail, and the scope of the present inventive concepts is not limited by the illustrations or illustrative terms unless they are limited by claims.

It will be understood that elements and/or properties thereof (e.g., structures, surfaces, directions, or the like), which may be referred to as being "perpendicular," "parallel," "coplanar," or the like with regard to other elements and/or properties thereof (e.g., structures, surfaces, directions, or the like) may be "perpendicular," "parallel," "coplanar," or the like or may be "substantially perpendicular," "substantially parallel," "substantially coplanar," respectively, with regard to the other elements and/or properties thereof.

Elements and/or properties thereof (e.g., structures, surfaces, directions, or the like) that are "substantially perpendicular", "substantially parallel", or "substantially coplanar" with regard to other elements and/or properties thereof will be understood to be "perpendicular", "parallel", or "coplanar", respectively, with regard to the other elements and/or properties thereof within manufacturing tolerances and/or material tolerances and/or have a deviation in magnitude and/or angle from "perpendicular", "parallel", or "coplanar", respectively, with regard to the other elements and/or properties thereof that is equal to or less than 10% (e.g., a. tolerance of ±10%).

It will be understood that elements and/or properties thereof may be recited herein as being "the same" or "equal" as other elements, and it will be further understood that elements and/or properties thereof recited herein as being "identical" to, "the same" as, or "equal" to other elements may be "identical" to, "the same" as, or "equal" to or "substantially identical" to, "substantially the same" as or "substantially equal" to the other elements and/or properties thereof. Elements and/or properties thereof that are "substantially identical" to, "substantially the same" as or "substantially equal" to other elements and/or properties thereof will be understood to include elements and/or properties thereof that are identical to, the same as, or equal to the other elements and/or properties thereof within manufacturing tolerances and/or material tolerances. Elements and/or properties thereof that are identical or substantially identical to and/or the same or substantially the same as other elements and/or properties thereof may be structurally the same or substantially the same, functionally the same or substantially the same, and/or compositionally the same or substantially the same. While the term "same," "equal" or "identical" may be used in description of some example embodiments, it should be understood that some imprecisions may exist. Thus, when one element is referred to as being the same as or equal to another element, it should be understood that an element or a value is the same as another element within a desired manufacturing or operational tolerance range (e.g., ±10%).

It will be understood that elements and/or properties thereof described herein as being "substantially" the same and/or identical encompasses elements and/or properties thereof that have a relative difference in magnitude that is equal to or less than 10%. Further, regardless of whether elements and/or properties thereof are modified as "substantially," it will be understood that these elements and/or properties thereof should be construed as including a manufacturing or operational tolerance (e.g., ±10%) around the stated elements and/or properties thereof.

When the terms "about" or "substantially" are used in this specification in connection with a numerical value, it is intended that the associated numerical value includes a manufacturing or operational tolerance (e.g., ±10%) around the stated numerical value. Moreover, when the words "about" and "substantially" are used in connection with geometric shapes, it is intended that precision of the geometric shape is not required but that latitude for the shape is within the scope of the disclosure. Further, regardless of whether numerical values or shapes are modified as "about" or "substantially," it will be understood that these values and shapes should be construed as including a manufacturing or operational tolerance (e.g., ±10%) around the stated numerical values or shapes. When ranges are specified, the range includes all values therebetween such as increments of 0.1%.

As described herein, when an operation is described to be performed, or an effect such as a structure is described to be established "by" or "through" performing additional operations, it will be understood that the operation may be performed and/or the effect/structure may be established "based on" the additional operations, which may include performing said additional operations alone or in combination with other further additional operations.

As described herein, an element that is described to be "spaced apart" from another element, in general and/or in a particular direction (e.g., vertically spaced apart, laterally spaced apart, etc.) and/or described to be "separated from" the other element, may be understood to be isolated from direct contact with the other element, in general and/or in the particular direction (e.g., isolated from direct contact with the other element in a vertical direction, isolated from direct contact with the other element in a lateral or horizontal direction, etc.). Similarly, elements that are described to be "spaced apart" from each other, in general and/or in a particular direction (e.g., vertically spaced apart, laterally spaced apart, etc.) and/or are described to be "separated" from each other, may be understood to be isolated from direct contact with each other, in general and/or in the particular direction (e.g., isolated from direct contact with each other in a vertical direction, isolated from direct contact with each other in a lateral or horizontal direction, etc.). Similarly, a structure described herein to be between two other structures to separate the two other structures from each other may be understood to be configured to isolate the two other structures from direct contact with each other.

FIG. 1 is an example block diagram of an image sensing system according to some example embodiments.

Referring to FIG. 1, the image sensing system 100 includes an image sensor 102 and an application processor 104.

The image sensor 102 may sense an image of a sensing target using light, generate an image signal IDAT based on an electrical signal according to the image sensing, and process the image signal IDAT to transmit the processed signal to the application processor 104. In some example embodiments, for example, the generated image signal IDAT may be a digital signal, but example embodiments according to the technical idea of the present inventive concepts are not limited thereto.

The application processor 104 may control overall operations of elements of the image sensing system 100. In addition, the application processor 104 may perform various image processing based on image data generated from the image sensor 102.

The image sensor 102 may include logic circuits 111, . . . , 119 that drive a pixel array 110 and process signals from the pixel array 110.

The pixel array 110 may include a plurality of pixels disposed (e.g., arranged) in a matrix form, and each of the plurality of pixels may be connected to a plurality of row lines and a plurality of column lines. Each pixel of the plurality of pixels may include at least one light sensing element. For example, the light sensing element (or a photo-sensing element) may include a photodiode, a phototransistor, a photogate, a pinned photodiode, or the like. In some example embodiments, each pixel of the plurality of pixels may include a plurality of light sensing elements.

The row driver 111 may drive the pixel array 110 row by row. The row driver 111 may decode a row control signal (e.g., an address signal) generated by a timing generator 113, and may select at least one row line among row lines included in the pixel array 110 in response to the decoded row control signal. For example, the row driver 111 may generate a row selection signal. The pixel array 110 may output a pixel signal from a row selected by the row selection signal provided from the row driver 111.

The readout circuit 112 may sample the pixel signal provided from the pixel array 110, may compare the sampled pixel signal with a ramp signal, and may convert an analog image signal to a digital image signal based on the comparison result. The readout circuit 112 may include an analog-to-digital converter (ADC). In some example embodiments, the ADC may include a correlated double sampler (CDS), a counter, and the like. The correlated double sampler may be connected to the pixels through the column lines, and may output a signal based on a difference between a reset voltage and the ramp signal and a signal based on a difference between a pixel voltage and the ramp signal. The counter may convert signals output from the correlated double sampler to the digital image signal using a clock signal CLK supplied by a phase lock loop (PLL) 119, and may transfer the converted digital image signal to a buffer 116.

The timing generator 113 may generate a signal serving as a reference for operating timing of various components of the image sensor 102. The operating timing reference signal generated by the timing generator 113 may be transferred to the row driver 111, the readout circuit 112, a ramp signal generator 114, and the like.

The ramp signal generator 114 may generate a ramp signal that changes with a particular (or, alternatively, predetermined) slope based on the clock signal, and may transfer the generated ramp signal to the readout circuit 112. For example, the ramp signal generator 114 may generate the ramp signal having various slopes according to an operation mode, and may transfer the generated ramp signal to the readout circuit 112.

The control register block 115 may control an overall operation of the image sensor 102. In particular, the control register block 115 may directly transmit an operation signal to the timing generator 113, the ramp signal generator 114, and the buffer 116. The control register block 115 may store a control signal received from the application processor 104, and may provide the received control signal to the timing generator 113.

For example, the buffer 116 may include a latch (or a latch unit). The buffer 116 may temporarily store the image signal IDAT from the readout circuit 112, and may transmit the image signal IDAT to the image signal processor 117.

The image signal DAT may be provided to the image signal processor 117 to be processed. The image signal processor 117 may receive the image signal IDAT output from the buffer 116 of the image sensor 102, and may process the received image signal IDAT to facilitate display.

The image sensor 102 may communicate with the application processor 104 through the interface circuit 118. The interface circuit 118 may communicate with the application processor 104 based on a communication protocol such as a serial peripheral interface (SPI), an Inter-Integrated Circuit (I2C), an Improved Inter-Integrated Circuit (I3C), a general purpose input/output (GPIO), or the like. In some example embodiments, an interface of the interface circuit 118 may be implemented as a camera serial interface (CSI) based a mobile industry processor interface (MIPI). On the one hand, a type of the interface of the interface circuit 118 is not limited thereto, and the interface of the interface circuit 118 may be implemented according to various protocol standards.

The phase lock loop (or a phase locked loop) 119 may receive an external clock signal (not shown) from the outside of the image sensor 102 to generate the internal clock signal CLK having a constant frequency. The phase lock loop 119 may supply the internal clock signal CLK to each component 110, . . . , 118 of the image sensor 102 for operation of each component 110, . . . , 118. According to some example embodiments, the phase lock loop 119 may be implemented as a digital programing PLL. In some example embodiments, the phase lock loop 119 may be referred to, may implement, may be implemented by, and/or may be included in a clock signal generator.

Figure 2:
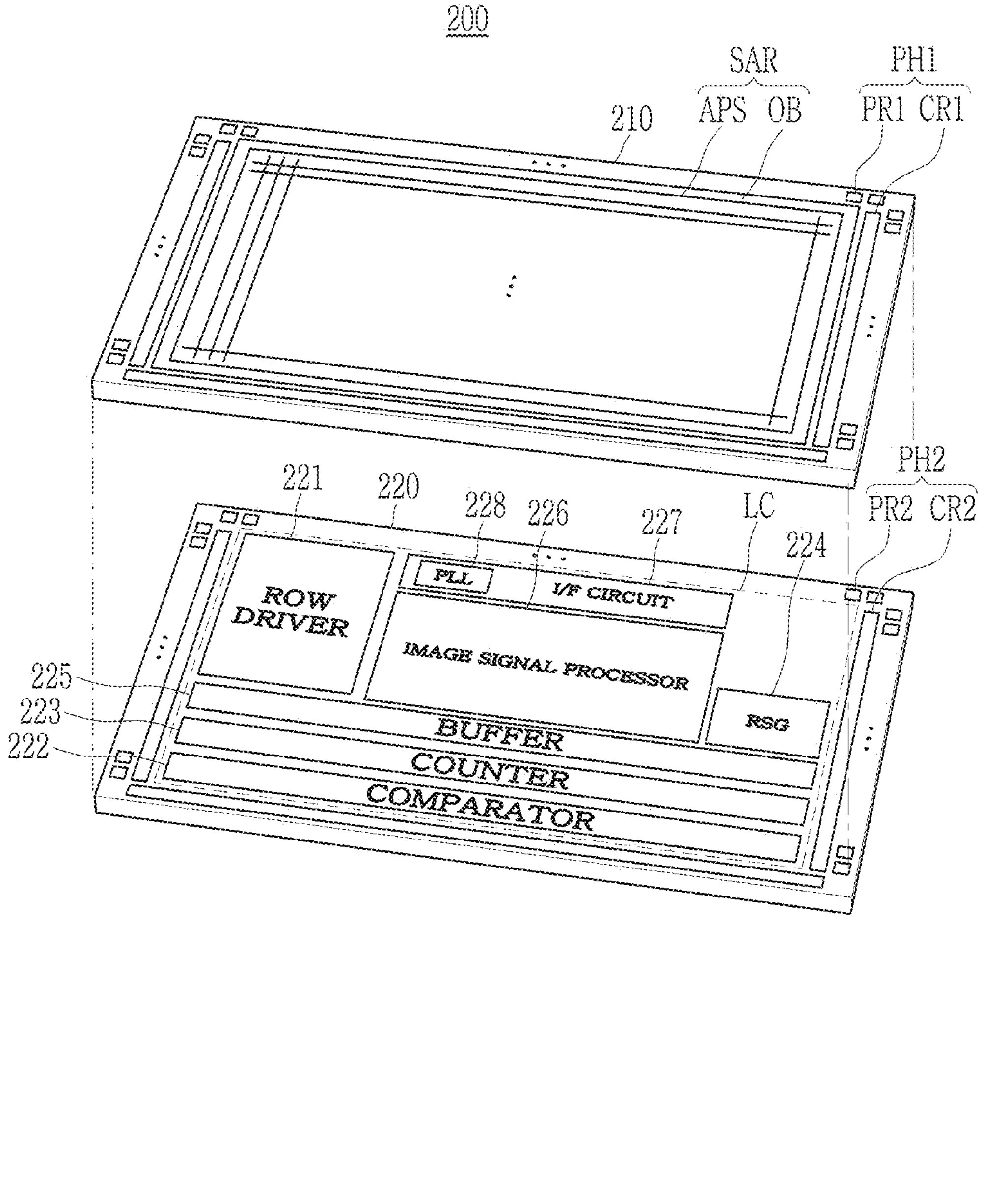
FIG. 2 is a view for explaining a package of an image sensor of FIG. 1 according to some example embodiments.

FIG. 2 is a view for explaining a package of the image sensor of FIG. 1 according to some example embodiments.

Referring to FIG. 2, an image sensor 200 according to some example embodiments may include a first layer 210 and a second layer 220 below the first layer 210.

The first layer 210 may include a sensor array region SAR and a first peripheral region PH1, and the second layer 220 may include a logic circuit region LC and a second peripheral region PH2.

In some example embodiments, a substrate of the first layer 210 and a substrate of the second layer 220 may be stacked to each other. For example, the sensor array region SAR and the first peripheral region PH1 of the first layer 210 may be disposed at an upper surface (or an upper face) of the substrate of the first layer, and the logic circuit region LC and the second peripheral region PH2 of the second layer 220 may be disposed at an upper surface of the substrate of the second layer disposed below the substrate of the first layer. In some example embodiments, the substrate of the first layer 210 and the substrate of the second layer 220 may vertically overlap each other (e.g., overlap each other in a vertical direction that extends perpendicular to at least the substrate of the first layer 210 and/or the substrate of the second layer 220). Accordingly, in some example embodiments, the pixel array included in the sensor array region SAR may vertically overlap the logic circuit in the vertical direction extending perpendicular to at least the substrate of the first layer 210 and/or the substrate of the second layer 220.

In some example embodiments, the first layer 210 and the second layer 220 may be respectively disposed at the first and second surfaces (or first and second faces) of one substrate. For example, the sensor array region SAR and the first peripheral region PH1 of the first layer 210 may be disposed at an upper surface (e.g., one surface) of the substrate, and the logic circuit region LC and the second peripheral region PH2 of the second layer 220 may be disposed at a lower surface (e.g., an opposite surface, another surface, the other surface, a lower face, or the like) of the substrate.

At the first layer 210, the sensor array region SAR may include a region corresponding to the pixel array 110 of FIG. 1. Accordingly, the first layer 210 may be understood to include the pixel array 110. For example, the plurality of pixels disposed two-dimensionally (e.g., in a matrix form) may be formed within the sensor array region SAR. Each of the plurality of pixels may include a photodiode that receives light to generate a charge, a pixel circuit that processes the charge generated by the photodiode, and the like. The pixel circuit may include a plurality of transistors for outputting a voltage corresponding to the charge generated by the photodiode.

The sensor array region SAR may include a light receiving region APS where light is exposed and a light blocking region OB. The pixel array 110 that receives light to generate an active signal may be disposed at the light receiving region APS. Optical black pixels that generate an optical black signal by blocking light may be disposed at the light blocking region OB. For example, the light blocking region OB may be formed along a periphery of the light receiving region APS, but this is only an example. In some example embodiments, dummy pixels (not shown) may be formed at the light receiving region APS adjacent to the light blocking region OB.

The first peripheral region PH1 may include a connection region CR1 and a pad region PR1. The connection region CR1 may be formed around the sensor array region SAR. The connection region CR1 may be formed at one side of the sensor array region SAR, but this is only an example. Wires may be located at the connection region CR1, and may transmit and receive an electrical signal of the sensor array region SAR.

The pad region PR1 may be formed around the sensor array region SAR. The pad region PR1 may be formed adjacent to an edge of the image sensor according to some example embodiments, but this is only an example.

At the second layer 220, the logic circuit region LC may include electronic elements. In some example embodiments, the electronic elements included in the logic circuit region LC may be electrically connected to the pixel array 110 through a connection region CR2 to provide a constant signal to each unit pixel of the pixel array 110 or control an output signal. For example, the control register block 115 and the timing generator 113 that are described with reference to FIG. 1, a row driver 221, readout circuits 222 and 223, a ramp signal generator 224, a buffer 225, an image signal processor 226, an interface circuit 227, a phase lock loop 228, and the like, may be disposed at the logic circuit region LC. For example, blocks among the components of FIG. 1 other than the pixel array 110 may be disposed at the logic circuit region LC. For example, the second layer 220 may be understood to include a clock signal generator configured to generate a clock signal, at least one buffer configured to receive the clock signal from the clock signal generator and output the block signal, and an analog-to-digital converter connected to the plurality of pixels of the pixel array 110 and configured to operate based on the clock signal.

The second peripheral region PH2 may be disposed at a region corresponding to the first peripheral region PH1 of the first layer 210 in the second layer 220. In some example embodiments, the pad region PR1 may be connected to a pad region PR2 of the second layer 220 through a via. The pad region PR2 may be connected to the electronic elements included in the logic circuit region LC.

Although not shown in the drawings, a third layer, which may include a third substrate that is separate from the substrate of the first layer 210 and the substrate of the second layer 220, may be disposed below the second layer 220. In some example embodiments, the image signal processor 226 among elements disposed at the logic circuit region LC may be disposed at the third layer. In some example embodiments, a memory may be disposed at the third layer. The memory and the image signal processor 226 disposed at the third layer may receive image data from the first layer 210 and/or the second layer 220 to store the received image data or process the received image data and retransmit the stored or processed image data to the first layer 210 and the second layer 220. In this case, the memory may include a memory device such as a dynamic random access memory (DRAM) device, a static random access memory (SRAM) device, a spin transfer torque magnetic random access memory (STT-MRAM) device, or a flash memory device. For example, when the memory includes the DRAM device, the memory may receive the image data at a relatively high speed to process the receive mage data. In some example embodiments, a memory may be disposed at the second layer 220.

In some example embodiments, the first layer 210 and the second layer 220 may be stacked on each other at a wafer level, and the third layer may be attached to a lower portion of the second layer 220 at a chip level. The first layer 210, the second layer 220, and the third layer may be provided as one semiconductor package.

According to a stacked structure of FIG. 2, photodiodes of a pixel array of the first layer 210 disposed at an upper portion of the second layer 220 may generate a charge due to heat generated by the electronic elements of the second layer 220. This will be described with reference to FIGS. 3 to 5.

Figure 3:
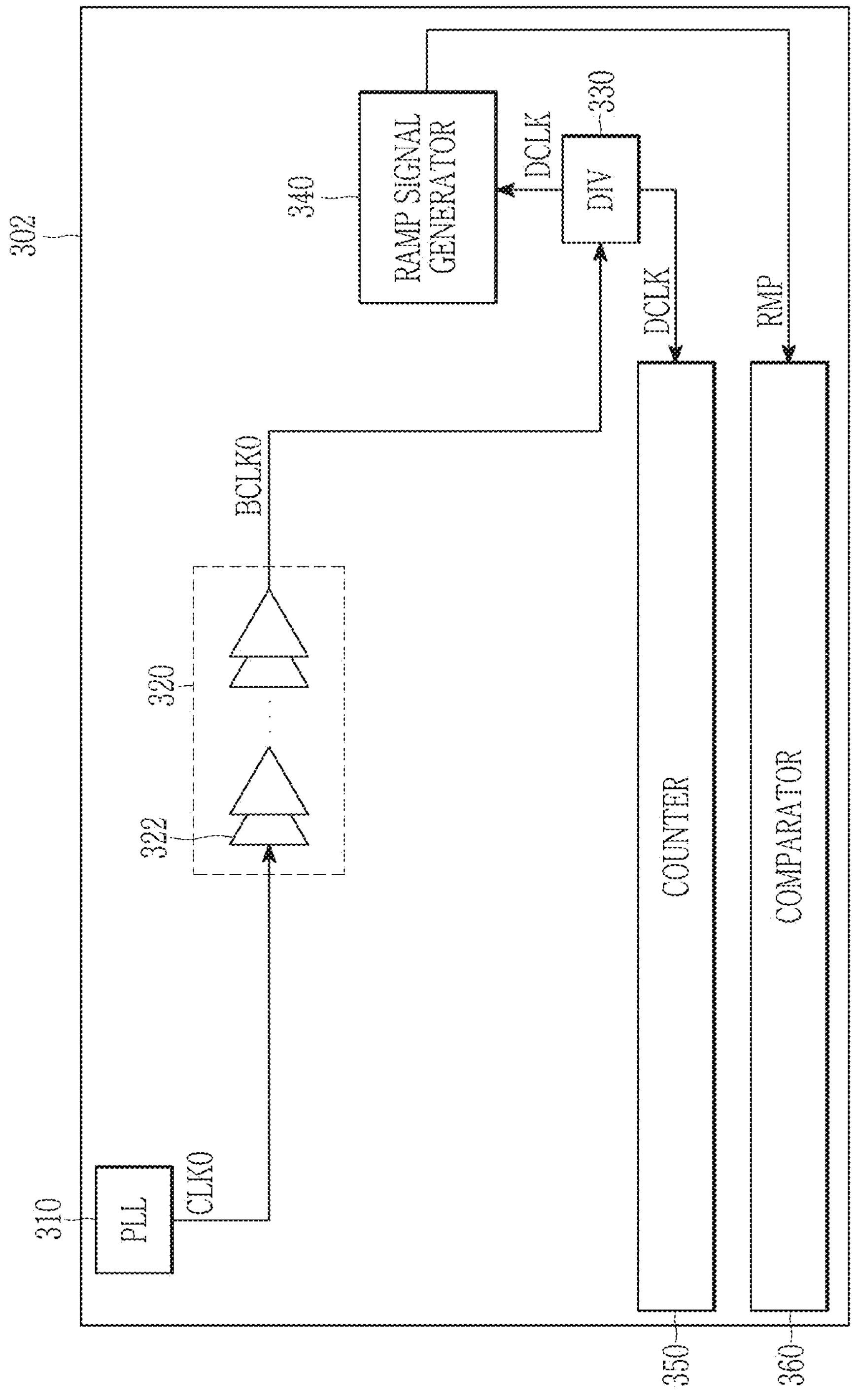
FIG. 3 is a plane view illustrating a layer of an image sensor according to some example embodiments.

FIG. 3 is a plane view illustrating a layer of the image sensor according to some example embodiments.

Referring to FIG. 3, electronic elements 310, . . . , 360 may be disposed at a substrate 302 of a second layer 300. The phase lock loop 310 may be spaced apart from a ramp signal generator 340 and a counter 350. The signal transfer device (or a signal transfer unit) 320 may be disposed between the phase lock loop 310, the ramp signal generator 340, and the counter 350. The phase lock loop 310 may generate a clock signal CLK0, and may transfer the clock signal CLK0 to a divider 330 through the signal transfer device 320. The signal transfer device 320 may include at least one buffer 322. The at least one buffer 322 may buffer the clock signal CLK0 and output a buffered clock signal BLCK0. The buffered clock signal BLCK0 output from the signal transfer device 320 may be transferred to the divider 330, and the divider 330 may generate a divided clock signal DCLK in synchronization with a rising edge or a falling edge of the buffered clock signal BLCK0. The clock signal CLK0, the buffered clock signal BLCK0, and the divided clock signal DCLK will be described with reference to FIG. 4.

Figure 4:
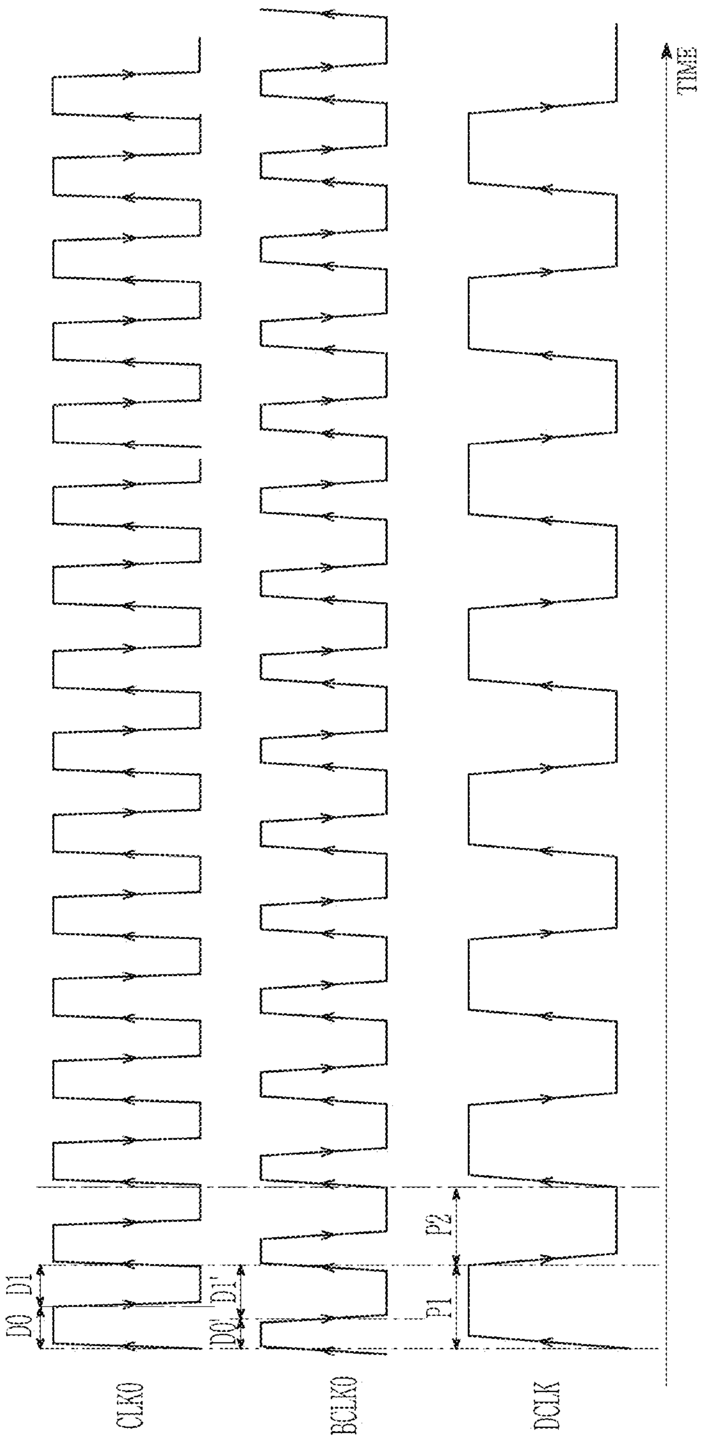
FIG. 4 is a timing diagram illustrating clock signals of the image sensor according to some example embodiments.

FIG. 4 is a timing diagram illustrating the clock signals of the image sensor according to some example embodiments.

Referring to FIG. 4, a frequency of the clock signal CLK0 may be 2f GHz, and a frequency of the clock signal DCLK divided by the divider 330 may be 1f GHz. The divided clock signal DCLK may have a rising edge or a falling edge at timing synchronized with a rising edge of the buffered clock signal BCLK0. Even if a clock duty of the clock signal CLK0 changes due to die variation, channel variation, and the like as the clock signal CLK0 is transferred through the signal transfer device 320, a time length of an on-duty period DO of the clock signal CLK0 is different from a time length of an on-duty period D0' of the buffered clock signal BCLK0. The time length of the on-duty period D0 of the clock signal CLK0 is longer or shorter than the time length of the on-duty period D0' of the buffered clock signal BCLK0. The time length of an off-duty period D1 of the clock signal CLK0 is longer or shorter than a time length of an off-duty period of the buffered clock signal BCLK0. Even if the clock duty D0', D1' of the buffered clock signal BCLK0 is different from the clock duty (DO, D1) of the clock signal CLK0, time length of an on-duty period P1 of the divided clock signal DCLK and a time length of an off-duty period P2 of the divided clock signal DCLK may be the same since a time length between rising edges of the buffered clock signal BCLK0 is constant.

The divider 330 may provide the divided clock signal DCLK to the ramp signal generator 340 and the counter 350. The ramp signal generator 340 and the counter 350 may operate in a double data rate (DDR) method in synchronization with both the rising edge and the falling edge of the clock signal DCLK.

The ramp signal generator 340 may generate a ramp signal RMP to provide the generated ramp signal to a comparator 360.

Even if a frequency of the clock signal to be used in the ramp signal generator 340 and the counter 350 is less than or equal to 1f GHz, the phase lock loop 310 may generate the clock signal CLK0 having a frequency of 2f GHz in consideration of deterioration of the clock signal CLK0 by the signal transfer device 320. That is, even if the clock signal CLK0 having a frequency of 2f GHz is transferred through the signal transfer device 320, the divided clock signal DCLK in which the time lengths of the on-duty period P1 and the off-duty period P2 are constant may be generated since a period between rising edges of the buffered clock signal BCLK0 or a period between falling edges of the buffered clock signal BCLK0 is constant. Accordingly, the ramp signal generator 340 and the counter 350 may normally operate by the divided clock signal DCLK.

The phase lock loop 310 operates at high speed to generate the clock signal CLK0 having a frequency of 2f GHz so that power consumption is relatively large. Since the phase lock loop 310 that occupies a small area of the second layer 300 consumes large amounts of power, a heat generation phenomenon may occur in the small area. Heat due to the heat generation phenomenon may affect the pixel array disposed at the first layer 210 of FIG. 2. In particular, when the image sensor photographs (or captures) a dark image, a charge may be generated at photodiodes of some pixels disposed locally due to local heat generation so that a dark shading phenomenon that generates image data having an overall non-uniform gray scale occurs. The dark shading phenomenon will be described with reference to FIG. 5.

Figure 5:
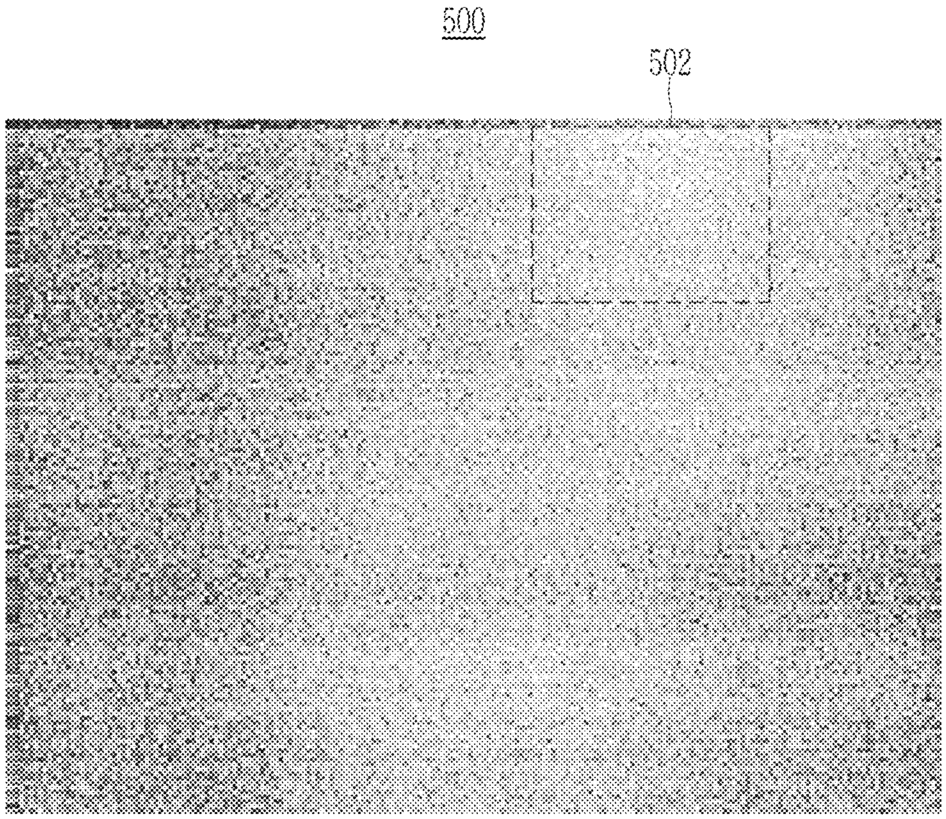
FIG. 5 is a view illustrating a dark image photographing image of the image sensor of FIG. 3 according to some example embodiments.

FIG. 5 is a view illustrating a dark image photographing image of the image sensor of FIG. 3 (e.g., generated by the image sensor of FIG. 3) according to some example embodiments.

Referring to FIG. 5, an image 500 represents gray scales sensed at each position of the light receiving region APS when the image sensor 200 photographs (e.g., captures, generates, etc.) the dark image. It may be seen that gray scales of some regions 502 corresponding to the phase lock loop 310 (e.g., some regions 502 corresponding to pixels of a first layer 210 that are vertically overlapped with, and thus closest to, the phase lock loop 310 of the second layer 300, corresponding to the phase lock loop 228 of the second layer 220, that is underneath the first layer 210) are measured to be higher than those of other regions in FIG. 5 so that the dark shading phenomenon occurs. Specifically, an average gray scale value of 20×20 pixels within some regions 502 is measured to be 1.69 higher than an average gray scale value of the image 500.

Figure 6:
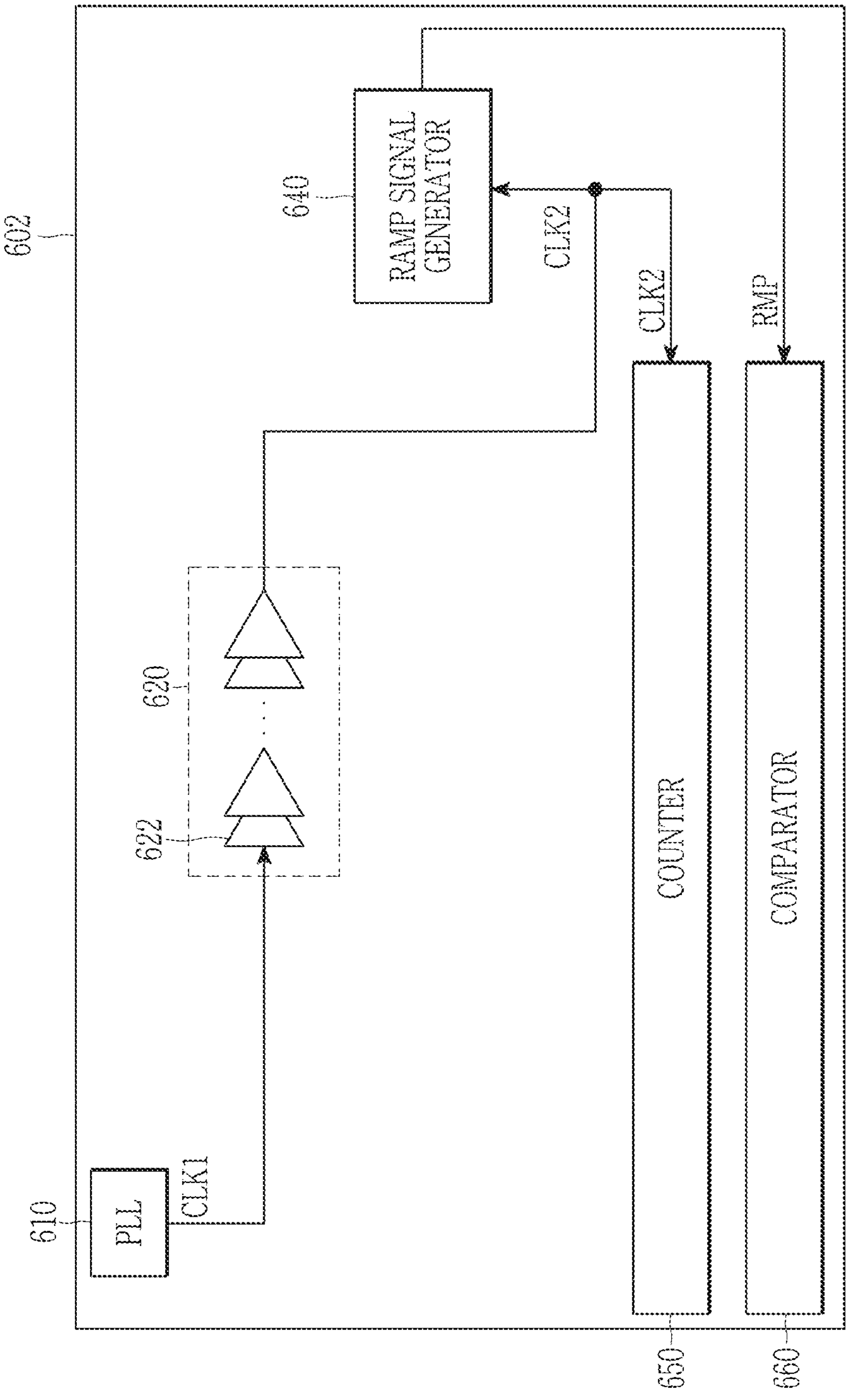
FIG. 6 is a plane view illustrating a layer of the image sensor according to some example embodiments.

FIG. 6 is a plane view illustrating a layer of the image sensor according to some example embodiments.

Referring to FIG. 6, electronic elements 610, . . . , 660 may be disposed at a substrate 602 of a second layer 600. It will be understood that elements described herein as being disposed at a substrate of a layer may be understood to be included in the layer. The phase lock loop 610 may be disposed at a first region above or on the substrate 602. The ramp signal generator 640 and a counter 650 may be disposed at a second region spaced apart from the first region. The signal transfer device (or a signal transfer unit) 620 may be disposed between the phase lock loop 610, the ramp signal generator 640, and the counter 650. The phase lock loop 610 may generate a clock signal CLK1 (also referred to herein as a first clock signal), and may transfer the clock signal CLK1 to the ramp signal generator 640 and the counter 650 through the signal transfer device 620. The signal transfer device 620 may include at least one buffer 622. A clock signal CLK2 output from the signal transfer device 620 (e.g., a buffered clock signal, a second clock signal, or the like) may be transferred to the ramp signal generator 640 and the counter 650. The clock signals CLK1 and CLK2 will be described with reference to FIG. 7.

Figure 7:
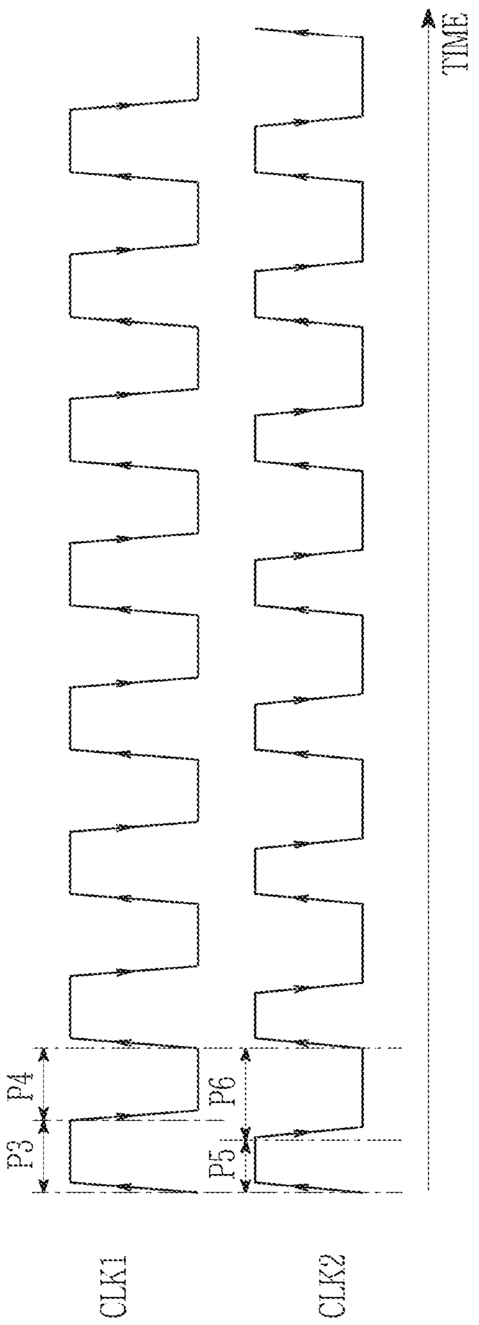
FIG. 7 is a timing diagram illustrating clock signals of the image sensor according to some example embodiments.

FIG. 7 is a timing diagram illustrating the clock signals of the image sensor according to some example embodiments.

The phase lock loop 610 may generate the clock signal CLK1 having a frequency of 1f GHz. Since the phase lock loop 610 generates the clock signal CLK1 of a lower frequency than the phase lock loop 310 of FIG. 3 and the phase lock loop 610 operates at a lower speed than the phase lock loop 310 of FIG. 3, power consumption is relatively small, and thus power consumption by the image sensor including the second layer 600 to generate images may be reduced (e.g., the image sensor may exhibit improved power consumption efficiency). Therefore, a heat generation phenomenon of the phase lock loop 610 of the image sensor according to some example embodiments may be suppressed, reduced, minimized, or the like, and an effect of heat on the pixel array disposed at the first layer 210 of FIG. 2 may be reduced. Therefore, according to some example embodiments, the dark shading phenomenon that may occur due to local heat generation may be mitigated, reduced, minimized, or prevented, and therefore an image sensor including the second layer 600 may be configured to generate images having improved quality due to having reduced, minimized, or prevented dark shading phenomenon, and therefore the image sensor may be understood to have improved operating performance. This will be described with reference to FIG. 8.

Figure 8:
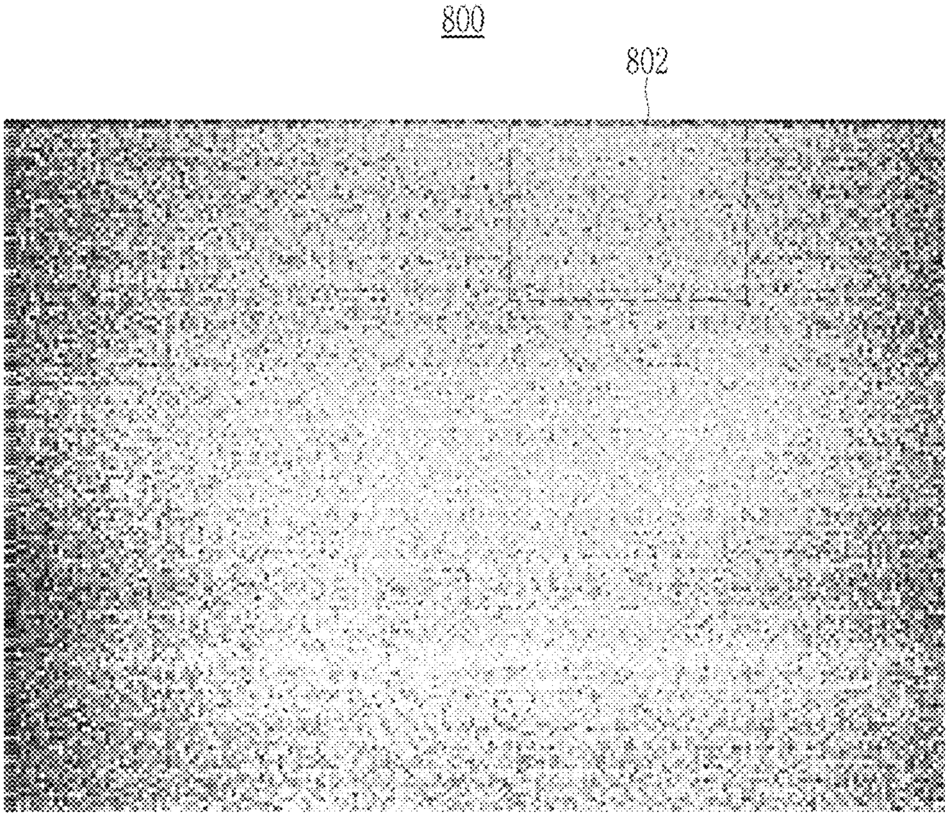
FIG. 8 is a view illustrating a dark image photographing image of the image sensor of FIG. 6 according to some example embodiments.

FIG. 8 is a view illustrating a dark image photographing image of the image sensor of FIG. 6 according to some example embodiments.

Referring to FIG. 8, an image 800 represents gray scales sensed at each position of the light receiving region APS when the image sensor 200 photographs a dark image. It may be seen that a difference between gray scales of some regions 802 corresponding to the phase lock loop 610 and gray scales of other regions is reduced in FIG. 8. Specifically, an average gray scale value of 20×20 pixels within the regions 802 is measured to be 1.22 higher than an average gray scale value of the image 800. That is, according to some example embodiments, it may be seen that the dark shading phenomenon of images generated by an image sensor including the second layer 600 is alleviated by 0.47 compared with the measurement result of FIG. 5 with regard to of images generated by an image sensor including the second layer 300. In addition, since the clock signal CLK1 of a low frequency is transferred, power consumption for an operation of the at least one buffer 622 (and thus power consumption by the image sensor including the second layer 600 to generate images) may be reduced.

In FIG. 7, a time length of an on-duty period P3 of the clock signal CLK1 and a time length of an off-duty period P4 of the clock signal CLK1 may be the same or substantially the same. Time lengths of an on-duty period P5 and an off-duty period P6 of the clock signal CLK2 output from the clock signal CLK1 through the signal transfer device 620 may be different. That is, the time lengths of the duty periods P3 and P4 may be changed by the signal transfer device 620. Therefore, since the clock signal CLK2 having different duty periods P5 and P6 is applied to the ramp signal generator 640 and the counter 650 operating in a double data rate (DDR) method, quality degradation of the ramp signal generator 640 and the counter 650 may occur.

Figure 9:
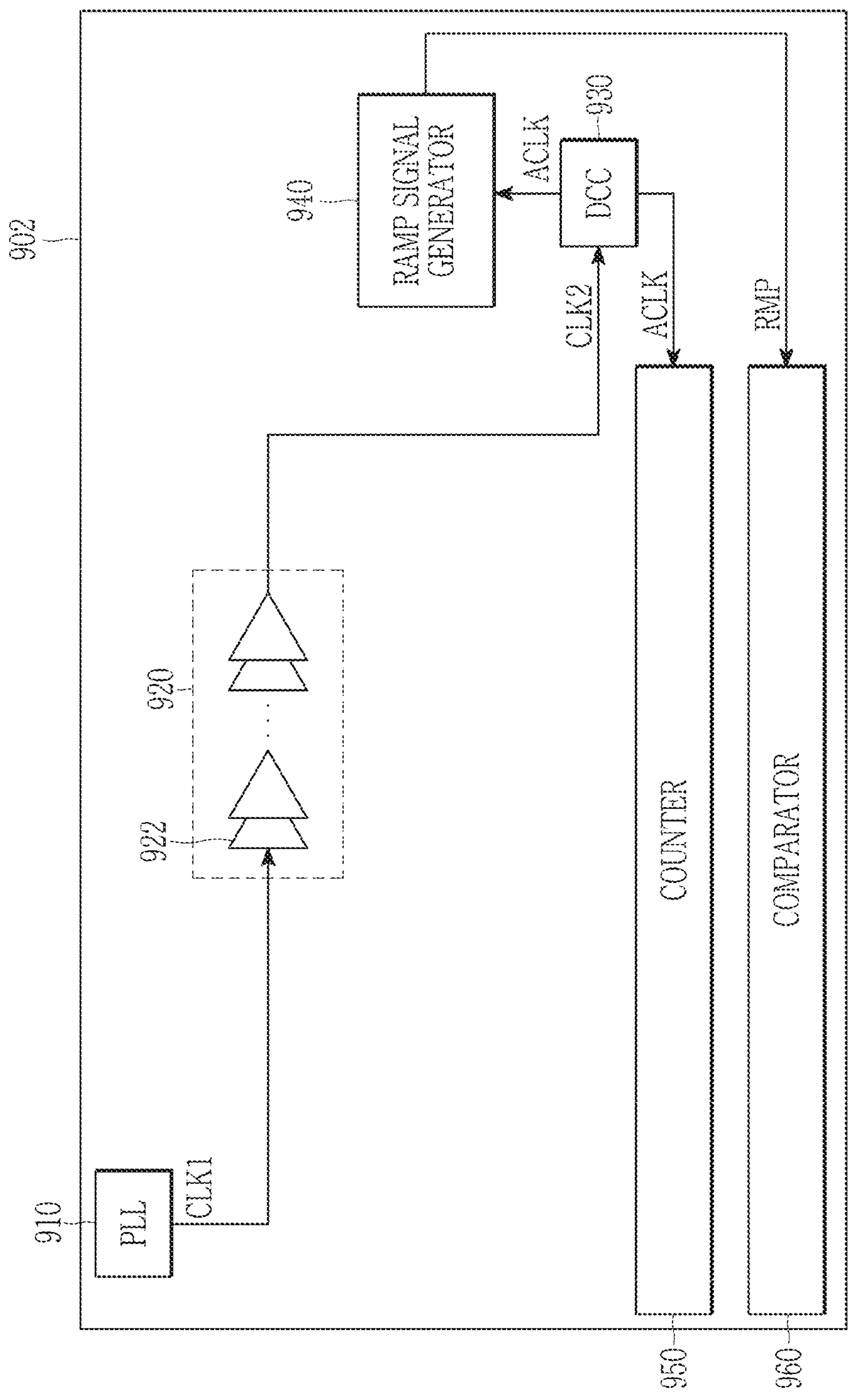
FIG. 9 is a plane view illustrating a layer of the image sensor according to some example embodiments.

FIG. 9 is a plane view illustrating a layer of the image sensor according to some example embodiments.

Referring to FIG. 9, electronic elements 910, . . . , 960 may be disposed at a substrate 902 of a second layer 900. The phase lock loop 910 may be disposed at a first region above or on the substrate 902. A ramp signal generator 940 and a counter 950 (e.g., a readout circuit) may be disposed at a second region spaced apart from the first region. A signal transfer device (or a signal transfer unit) 920 may be disposed between the phase lock loop 910, the ramp signal generator 940, and the counter 950. A duty correction circuit (DCC) 930 may be disposed at a third region closer (e.g., proximate) to the ramp signal generator 940 and the counter 950 than the phase lock loop 910 (e.g., in a plane extending parallel to the substrate 902). The phase lock loop 910 may generate a clock signal CLK1 (e.g., first clock signal) having a frequency of 1f GHz, and may transfer the clock signal CLK1 to the duty correction circuit (DCC) 930 through the signal transfer device 920. The signal transfer device 920 may include at least one buffer 922. A clock signal CLK2 (e.g., buffered clock signal, second clock signal, etc.) output from the signal transfer device 920 may be transferred to the duty correction circuit 930, and the duty correction circuit 930 may adjust a duty ratio of the clock signal CLK2 to generate a clock signal ACLK (also referred to herein as a third clock signal) having a frequency of 1f GHz. As shown, the duty correction circuit 930 may directly output the clock signal ACLK to at least the counter 950 (e.g., an ADC of the image sensor). In some example embodiments, the duty correction circuit 930 may directly output the clock signal ACLK to at least the counter 950 without the clock signal ACLK passing any intervening component (aside from wiring, conductive paths, or the like), such as the ramp signal generator 940, between the duty correction circuit 930 and the counter 950. The duty correction circuit 930 may correct a duty cycle deterioration of the clock signal CLK2 due to die variation, channel variation, and the like. The clock signals CLK1, CLK2, and ACLK will be described with reference to FIG. 10.

Figure 10:
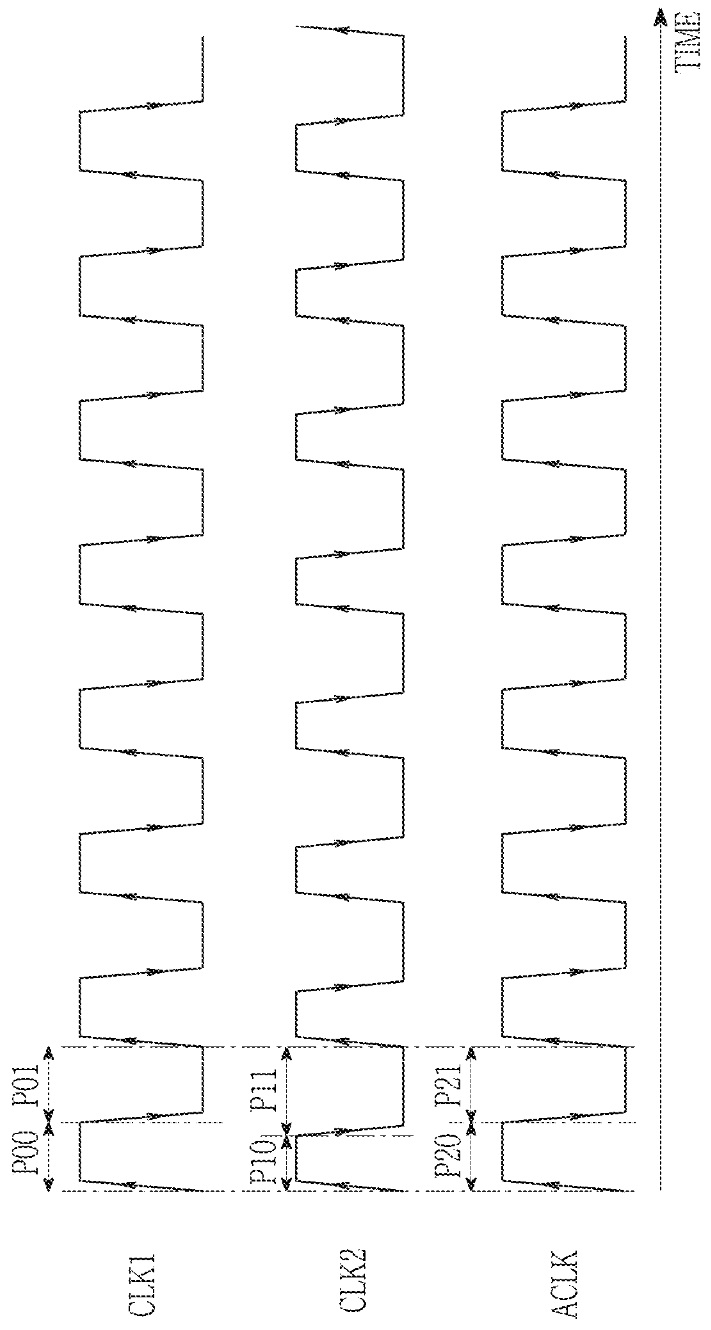
FIG. 10 is a timing diagram illustrating clock signals of the image sensor according to some example embodiments.

FIG. 10 is a timing diagram illustrating the clock signals of the image sensor according to some example embodiments.

Referring to FIG. 10, the phase lock loop 910 may generate the clock signal CLK1 having a frequency of 1f GHz. Since the phase lock loop 910 generates the clock signal CLK1 of a lower frequency than the phase lock loop 310 of FIG. 3 and the phase lock loop 910 operates at a lower speed than the phase lock loop 310 of FIG. 3, power consumption is relatively small. Therefore, a heat generation phenomenon of the phase lock loop 910 of the image sensor according to some example embodiments may be suppressed, reduced, minimized, or the like, and an effect of heat on the pixel array disposed at the first layer 210 of FIG. 2 may be reduced, minimized, or prevented. Therefore, according to some example embodiments, the dark shading phenomenon that may occur due to local heat generation may be mitigated, reduced, minimized, or prevented, thereby improving the image generation performance of an image sensor including the second layer 900 to generate images having improved quality due to mitigated, reduced, minimized, or prevented dark shading phenomenon exhibition in the images. In addition, since the clock signal CLK1 of a low frequency is transferred, power consumption for an operation of the at least one buffer 922 may be reduced, and thus power consumption of the image sensor to generate images may be reduced (e.g., improved).

Time lengths of an on-duty period P00 and an off-duty period P01 of the clock signal CLK1 may be substantially the same. Time lengths of an on-duty period P10 and an off-duty period P11 of the clock signal CLK2 output from the clock signal CLK1 through the signal transfer device 920 may be different. That is, the time lengths of the duty periods P10 and P11 may be changed by the signal transfer device 920. The clock signal ACLK output from the duty correction circuit 930 may correct the duty cycle deterioration. Time lengths of an on-duty period P20 and an off-duty period P21 of the clock signal ACLK may be substantially the same. In some example embodiments, the frequency of the clock signal ACLK may be the same or substantially the same as the frequency of the clock signal CLK1. In some example embodiments, the frequency of the clock signal CLK2 may be the same or substantially the same as the frequency of the clock signal CLK1. Accordingly, the ramp signal generator 940 and the counter 950 may normally operate by the clock signal ACLK.

Figure 11:
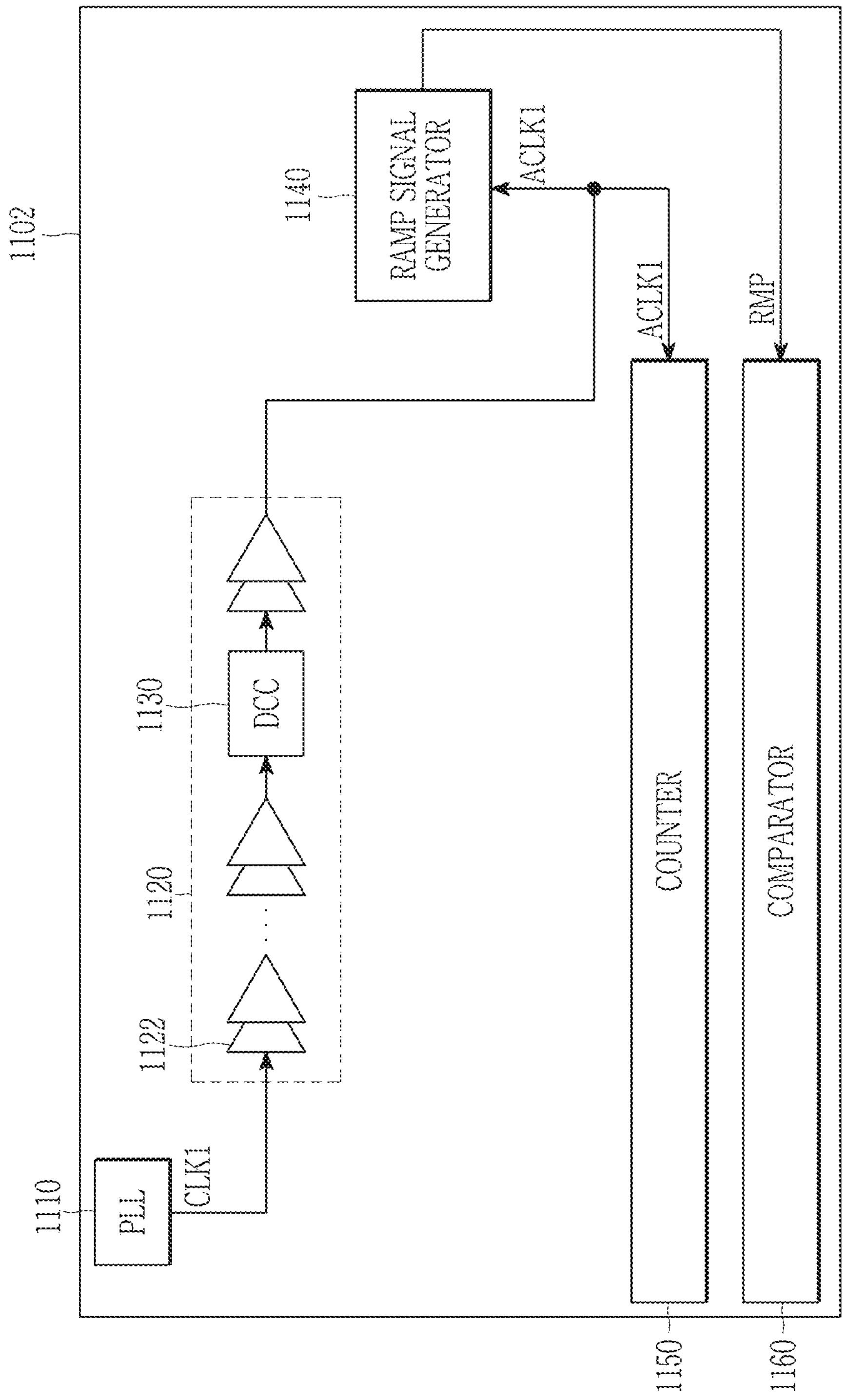
FIG. 11 is a plane view illustrating a layer of the image sensor according to some example embodiments.

FIG. 11 is a plane view illustrating a layer of the image sensor according to some example embodiments.

Referring to FIG. 11, electronic elements 1110, . . . , 1160 may be disposed at a substrate 1102 of a second layer 1100. The phase lock loop 1110 may generate a clock signal CLK1 having a frequency of 1f GHz, and may transfer the clock signal CLK1 to the signal transfer device (or a signal transfer unit) 1120. The signal transfer device 1120 may include at least one buffer 1122 and a duty correction circuit 1130. The duty correction circuit 1130 may be connected between buffers 1122. For example, the signal transfer device 1120 may include a plurality of buffers 1122 (e.g., at least two buffers) which may be communicatively coupled (e.g., in series) between the phase lock loop 1110 and the ramp signal generator 1140, and the duty correction circuit 1130 may be communicatively coupled in series between adjacent buffers of the plurality of buffers 1122. In some example embodiments the buffers 1122 coupled in series between the phase lock loop 1110 and the ramp signal generator 1140 are a portion of the buffers 1122 of the signal transfer device 1120. A signal output from some of the at least one buffer 1122 may be input to an input terminal of the duty correction circuit 1130, and an output terminal of the duty correction circuit 1130 may be connected to the others of the at least one buffer 1122. A clock signal whose duty ratio is adjusted by the duty correction circuit 1130 may be output through the at least one buffer 1122. A clock signal ACLK1 having a frequency of 1f GHz output from the signal transfer device 1120 may be transferred to the ramp signal generator 1140 and the counter 1150. The duty correction circuit 1130 may correct a duty cycle deterioration of the clock signal CLK1 due to die variation, channel variation, and the like.

The phase lock loop 1110 may generate the clock signal CLK1 having a frequency of 1f GHz. Since the phase lock loop 1110 generates the clock signal CLK1 of a lower frequency than the phase lock loop 310 of FIG. 3 and the phase lock loop 1110 operates at a lower speed than the phase lock loop 310 of FIG. 3, power consumption is relatively small. Therefore, a heat generation phenomenon of the phase lock loop 1110 of the image sensor according to some example embodiments may be suppressed, reduced, minimized, or the like, and an effect of heat on the pixel array disposed at the first layer 210 of FIG. 2 may be reduced, minimized, or prevented. Therefore, according to some example embodiments, the dark shading phenomenon that may occur due to local heat generation may be mitigated, reduced, minimized, or prevented, thereby improving the image generation performance of an image sensor including the second layer 1100 to generate images having improved quality due to mitigated, reduced, minimized, or prevented dark shading phenomenon exhibition in the images. In addition, since the clock signal CLK1 of a low frequency is transferred, power consumption for an operation of the at least one buffer 1122 may be reduced, and thus power consumption of the image sensor to generate images may be reduced (e.g., improved).

Figure 12:
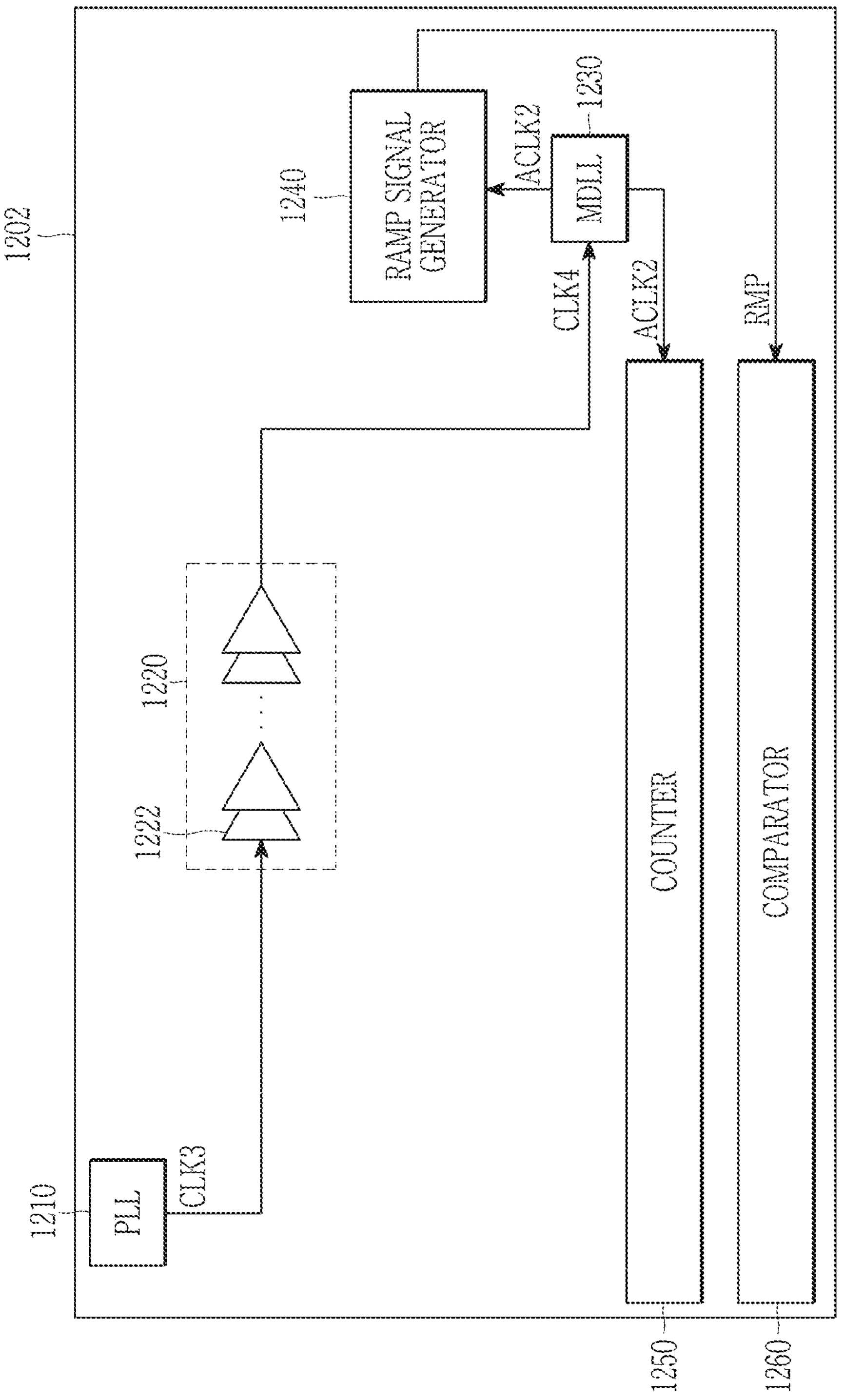
FIG. 12 is a plane view illustrating a layer of the image sensor according to some example embodiments.

FIG. 12 is a plane view illustrating a layer of the image sensor according to some example embodiments.

Referring to FIG. 12, electronic elements 1210, . . . , 1260 may be disposed at a substrate 1202 of a second layer 1200. The phase lock loop 1210 may generate a clock signal CLK3 (e.g., a first clock signal) having a frequency of 0.5f GHz, and may transfer the clock signal to a multiplying delay locked loop (MDLL) 1230 through the signal transfer device (or a signal transfer unit) 1220. The signal transfer device 1220 may include at least one buffer 1222. A clock signal CLK4 (e.g., a buffered clock signal, a second clock signal, etc.) having a frequency of 0.5f GHz output from the signal transfer device 1220 may be transferred to the MDLL 1230, and the MDLL 1230 may adjust a frequency of the clock signal CLK4 to generate a clock signal ACLK2 (e.g., a third clock signal) having a frequency of 1f GHz.

The phase lock loop 1210 may generate the clock signal CLK3 having a frequency of 0.5f GHz. Since the phase lock loop 1210 generates the clock signal CLK3 of a lower frequency than the phase lock loop 310 of FIG. 3 and the phase lock loop 1210 operates at a lower speed than the phase lock loop 310 of FIG. 3, power consumption is relatively small. Therefore, a heat generation phenomenon of the phase lock loop 1210 of the image sensor according to some example embodiments may be suppressed, reduced, minimized, or the like, and an effect of heat on the pixel array disposed at the first layer 210 of FIG. 2 may be reduced, minimized, or prevented. Therefore, according to some example embodiments, the dark shading phenomenon that may occur due to local heat generation may be mitigated, reduced, minimized, or prevented, thereby improving the image generation performance of an image sensor including the second layer 1200 to generate images having improved quality due to mitigated, reduced, minimized, or prevented dark shading phenomenon exhibition in the images. In addition, since the clock signal CLK3 of a low frequency is transferred, power consumption for an operation of the at least one buffer 1222 may be reduced, and thus power consumption of the image sensor to generate images may be reduced (e.g., improved).

In some example embodiments, each component or a combination of two or more components described with reference to FIGS. 1 to 12 (including, for example, the image sensing system 100, the image sensor 102, the application processor 104, pixel array 110, the row driver 111, the readout circuit 112, the timing generator 113, the ramp signal generator 114, the control register block 115, the buffer 116, the image signal processor 117, the interface circuit 118, the phase lock loop 119, the image sensor 200, the first layer 210, the second layer 220, the row driver 221, the readout circuit 222, the readout circuit 223, the ramp signal generator 224, the buffer 225, the image signal processor 226, the interface circuit 227, the phase lock loop 228, the second layer 300, the substrate 302, the phase lock loop 310, the signal transfer device 320, the at least one buffer 322, the divider 330, the ramp signal generator 340, the counter 350, the comparator 360, the second layer 600, the substrate 602, the phase lock loop 610, the signal transfer device 620, the at least one buffer 622, the ramp signal generator 640, the counter 650, the comparator 660, the second layer 900, the substrate 902, the phase lock loop 910, the signal transfer device 920, the at least one buffer 922, the duty correction circuit 930, the ramp signal generator 940, the counter 950, the comparator 960, the second layer 1100, the substrate 1102, the phase lock loop 1110, the signal transfer device 1120, the at least one buffer 1122, the duty correction circuit 1130, the ramp signal generator 1140, the counter 1150, the comparator 1160, the second layer 1200, the substrate 1202, the phase lock loop 1210, the signal transfer device 1220, the at least one buffer 1222, the MDLL 1230, the ramp signal generator 1240, the counter 1250, the comparator 1260, any portion thereof, or the like), or any portion thereof, may include, may be included in, and/or may be implemented by one or more instances of processing circuitry such as hardware including logic circuits; a hardware/software combination such as a processor executing software; or any combination thereof. For example, the processing circuitry more specifically may include, but is not limited to, a central processing unit (CPU), an arithmetic logic unit (ALU), a digital circuit, a programmable logic device or array, an unprogrammable logic device or array, an application specific integrated circuit (ASIC), a microprocessor, a neural network processing unit (NPU), an Electronic Control Unit (ECU), an Image Signal Processor (ISP), or the like. In some example embodiments, the processing circuitry may include a non-transitory computer readable storage device (e.g., a memory, a DRAM device, etc.), storing a program of instructions, and a processor (e.g., CPU) configured to execute the program of instructions to implement the functionality and/or methods performed by some or all of any devices, systems, units, blocks, circuits, controllers, processors, and/or portions thereof according to any of the example embodiments.

While this inventive concepts have been described in connection with what is presently considered to be practical example embodiments, it is to be understood that the inventive concepts are not limited to such example embodiments, but, on the contrary, are intended to cover various modifications and equivalent arrangements included within the spirit and scope of the appended claims.

What is claimed is:

1. An image sensor, comprising:
a first substrate including a plurality of pixels; and
a second substrate including:
a clock signal generator configured to generate a first clock signal,
at least one buffer configured to receive the first clock signal from the clock signal generator and generate a buffered clock signal, and
a ramp signal generator configured to receive the buffered clock signal and generate a ramp signal based on the buffered clock signal,
wherein a time length of an on-duty period of the first clock signal is different from a time length of an on-duty period of the buffered clock signal based on a duty cycle deterioration of the buffered clock signal relative to the first clock signal.

2. The image sensor of claim 1, wherein a frequency of the buffered clock signal is substantially equal to the frequency of the first clock signal.

3. The image sensor of claim 1, wherein the time length of the on-duty period of the first clock signal is longer than the time length of the on-duty period of the buffered clock signal.

4. The image sensor of claim 3, wherein a time length of an off-duty period of the first clock signal is shorter than a time length of an off-duty period of the buffered clock signal.

5. The image sensor of claim 4, wherein the second substrate further comprises a counter configured to receive the buffered clock signal.

6. The image sensor of claim 5,
wherein the clock signal generator is disposed at a first region on the second substrate, the ramp signal generator is disposed at a second region on the second substrate, and the at least one buffer is disposed between the first region and the second region; and
wherein the first region is spaced apart from the second region.

7. An image sensor, comprising:
a first substrate including a plurality of pixels; and
a second substrate including:
a clock signal generator configured to generate a first clock signal,
at least one buffer configured to receive the first clock signal from the clock signal generator and generate a buffered clock signal, and
a duty correction circuit configured to,
receive the buffered clock signal, and
correct a duty cycle deterioration of the buffered clock signal relative to the first clock signal by adjusting a duty ratio of the buffered clock signal to generate a second clock signal.

8. The image sensor of claim 7, wherein the second substrate further comprises:
a ramp signal generator configured to receive the second clock signal and output a ramp signal; and
a comparator configured to receive the ramp signal from the ramp signal generator.

9. The image sensor of claim 7, wherein the second substrate further comprises a counter configured to receive the second clock signal.

10. The image sensor of claim 7, wherein a frequency of the first clock signal is a same frequency as a frequency of the second clock signal.

11. The image sensor of claim 7, wherein a time length of an on-duty period of the first clock signal is substantially a same frequency as a time length of an off-duty period of the first clock signal.

12. The image sensor of claim 7, wherein a time length of an on-duty period of the second clock signal is substantially a same frequency as a time length of an off-duty period of the second clock signal.

13. The image sensor of claim 7, wherein a time length of an on-duty period of the buffered clock signal is different from a time length of an off-duty period of the buffered clock signal.

14. The image sensor of claim 13, wherein the time length of the on-duty period of the buffered clock signal is shorter than the time length of the off-duty period of the buffered clock signal.

15. The image sensor of claim 7, wherein a frequency of the second clock signal is substantially a same frequency as a frequency of the buffered clock signal.

16. The image sensor of claim 8,
wherein the clock signal generator is disposed at a first region on the second substrate, the ramp signal generator is disposed at a second region on the second substrate, and the at least one buffer is disposed between the first region and the second region; and
wherein the first region is spaced apart from the second region.

17. The image sensor of claim 8, wherein a frequency of the first clock signal is a same frequency as a frequency of the second clock signal.

18. The image sensor of claim 8, wherein a frequency of the second clock signal is substantially a same frequency as a frequency of the buffered clock signal.

19. The image sensor of claim 9, wherein a frequency of the first clock signal is a same frequency as a frequency of the second clock signal.

20. The image sensor of claim 9, wherein a frequency of the second clock signal is substantially a same frequency as a frequency of the buffered clock signal.

* * * * *